United States Patent [19]
Brislawn

[11] Patent Number: 5,779,191
[45] Date of Patent: Jul. 14, 1998

[54] PYLON FLAP FOR INCREASING NEGATIVE PITCHING MOMENTS

[76] Inventor: Mark G. Brislawn, 1668 N. Nordic Dr., Orange, Calif. 90808

[21] Appl. No.: 751,929

[22] Filed: Nov. 12, 1996

Related U.S. Application Data

[60] Provisional application No. 60/008,620 Dec. 14, 1995.
[51] Int. Cl.$^6$ ..................... B64C 5/02
[52] U.S. Cl. ............... 244/75 R; 244/87; 244/194; 244/52; 244/23 D
[58] Field of Search ................. 244/75 R, 87, 244/88, 52, 51, 23 D, 55, 178, 191, 194, 195

[56] References Cited

U.S. PATENT DOCUMENTS

| | | |
|---|---|---|
| 3,275,267 | 9/1966 | Martin ................... 244/75 R |
| 3,455,523 | 7/1969 | Hertel ..................... 24/55 |
| 3,730,460 | 5/1973 | Mederer ................. 244/52 |
| 4,311,289 | 1/1982 | Finch . |
| 4,917,336 | 4/1990 | Jacobs et al. . |
| 4,966,338 | 10/1990 | Gordon . |
| 5,112,009 | 5/1992 | Farineau ............... 244/75 R |
| 5,156,353 | 10/1992 | Gliebe et al. . |

FOREIGN PATENT DOCUMENTS 1349150  3/1974  United Kingdom ............. 244/52

Primary Examiner—Galen L. Barefoot
Attorney, Agent, or Firm—Donald E. Stout

[57] ABSTRACT

First and second pylon flaps are located on aft portions of the first and second jet engine pylons, respectively. The first and second pylon flaps are moveable between retracted pylon flap angular orientations and extended pylon flap angular orientations. The first and second pylon flaps can assume only fully retracted angular orientations and fully extended angular orientations. When the T-tailed aircraft enters into a deep stall condition, the pilot will more than likely push the control column forward to its maximum position. This full forward movement of the control column commands the first and second pylon flaps to assume fully extended angular orientations. A first pylon flap controller controls the first pylon flap to move between the fully extended and fully retracted angular orientations, and a second pylon flap controller controls the second pylon flap to move between the fully extended and fully retracted angular orientations.

19 Claims, 1 Drawing Sheet

PYLON FLAP FOR INCREASING NEGATIVE PITCHING MOMENTS

CROSS REFERENCE TO RELATED APPLICATION

This application claims the benefit under 35 U.S.C. 119(e) of United States Provisional patent application Ser. No. 60/008,620, filed on Dec. 14, 1995, which application is herein expressly incorporated by reference.

FIELD OF THE INVENTION

The present invention relates generally to aircraft control surfaces and, more particularly, to moveable flaps located on engine pylons of aircraft having aft-fuselage-mounted jet engines. These flaps are used to generate aircraft nose-down pitching moments.

BACKGROUND OF INVENTION

When jet engines were incorporated into the design of commercial aircraft, one of the configurations that evolved had its engines mounted on the sides of the aft fuselage. To maintain good separation between the horizontal tail and the engine exhaust, the horizontal tail was usually moved to the top of the vertical tail. This empennage configuration became known as a "T-tail." A few aircraft have the horizontal tail mounted only part-way up the vertical tail, sometimes referred to as a cruciform tail. Below, the term "T-tail" refers to aircraft with cruciform tails, as well.

Early tests of airplanes with these types of tails indicated that besides normal airplane stall, which typically occurs around fifteen to twenty degrees of angle of attack, a second stall-like phenomena would often occur in the thirty-five to forty-five degree angle of attack range. This phenomena is called a "deep-stall" and refers to a condition where the horizontal tail enters the wing wake and/or the nacelle-pylon wake which reduces the tail effectiveness dramatically. The loss in tail effectiveness in some cases is so great that full airplane-nose-down elevator deflection cannot return the aircraft to the normal operational angle of attack range of zero to ten degrees. This deep-stall phenomena usually occurs for "T-tail" aircraft with wing mounted engines and invariably occurs for "T-tail" aircraft with aft-fuselage mounted engines.

Prior art approaches for solving this problem have included increasing the span of the horizontal tail and adding strakes to the nacelles. The added strakes have been somewhat effective in improving the air flow on the horizontal tail at deep-stall angles of attack. A third approach involves adding aft-fuselage strakes or a taillet (a very small, fixed horizontal surface usually mounted on the fuselage tailcone). The use of one or more of these design changes can be employed on "T-tail" aircraft to increase the aircraft nose-down pitching moments in deep-stall, so that in conjunction with full aircraft nose-down elevator deflection the pilot can fly out of a deep stall and return to normal operational angle of attack levels for continued safe flight.

Another prior art approach to the deep-stall problem involves the use of a "stick-pusher" for preventing the aircraft from reaching deep-stall angles of attack. An automatic system pushes the pilot's control-column forward whenever the aircraft angle of attack exceeds a preset limit, which is usually a few degrees past normal stall, to return the aircraft to acceptable angles of attack. At normal stall angles of attack, the horizontal tail and elevator remain very powerful. This approach is generally taken when the incorporation of aerodynamic fixes to recover from a deep-stall condition is considered to be impractical or too costly.

One prior art reference, U.S. Pat. No. 4,966,338, discloses moveable flaps located on pylon trailing edges of aft-fuselage-mounted engines with pusher propellers. These flaps are moveable in only an upward direction, and movement of these flaps in the upward direction actually aggravates deep-stall. The flaps are designed to minimize flow separation from the respective pylons to thereby reduce the air turbulence into the pusher propellers. Aft-fuselage engine designs with pusher propellers generally do not have deep-stall problems because of (1) normal forces on the propellers that cause large aircraft-nose-down pitching moments at high angles of attack, and (2) large aircraft-nose-down pitching moments generated by the airloads on the large-span pylons required to mount the pusher-propeller installation.

SUMMARY OF THE INVENTION

The pylon flap of the present invention provides additional aircraft-nose-down pitching moments for decreasing the angle of attack of a T-tailed aircraft in a deep stall condition. The T-tailed aircraft includes an aircraft fuselage with a forward portion, an aft portion, a left aft aircraft fuselage side, and a right aft aircraft fuselage side. A first jet engine is located on the right aft fuselage side, and a second jet engine is located on the left aft fuselage side. A first jet engine connector connects the first jet engine to the right aft aircraft fuselage side, and a second jet engine connector connects the second jet engine to the left aft aircraft fuselage side. A first jet engine pylon fits over the jet engine connector to thereby provide an aerodynamic surface to the first jet engine connector, and a second jet engine pylon fits over the second jet engine connector to similarly provide an aerodynamic surface to the second jet engine connector. The aerodynamic surfaces provided by the first engine pylon and the second engine pylon reduce the drag of the first and second jet engine connectors, respectively.

First and second pylon flaps are located on aft portions of the first and second jet engine pylons, respectively. The first and second pylon flaps are moveable between retracted pylon flap angular orientations and extended pylon flap angular orientations. The first and second pylon flaps, as implemented here, can assume only fully retracted angular orientations and fully extended angular orientations. If desired, the pylon flaps could be gradually deflected with control column input similar to elevator deflection.

When the T-tailed aircraft enters into a deep stall condition, the pilot will push the control column forward to its maximum position. This full forward movement of the control column commands the first and second pylon flaps to assume fully extended angular orientations. A first pylon flap actuator controls the first pylon flap to move between the fully retracted and fully extended angular orientations, and a second pylon flap controller controls the second pylon flap to move between the fully retracted and fully extended angular orientations.

According to the present invention, the two pylon flaps move simultaneously to achieve the same angular orientations at substantially the same time. The first and second pylon flaps do not generate any pitching moments on the T-tailed aircraft when they are in their respective fully retracted angular orientations.

Upon returning the aircraft to the normal angle of attack range, the pilot will move the control column from its forward position to a centered position as the aircraft levels off. As soon as the control column is moved from the maximum forward position, the first and second pylon flaps return to their respective fully retracted orientations.

To implement the deflection of the pylon flaps, the control column is attached to a cable, which moves in first and second directions according to forward and aft movement of the control column, respectively. A collar is connected to the cable, and therefore moves in the first and second directions with the cable. When the control column is moved in the maximum forward direction, the collar contacts and moves a hydraulic valve arm. When the hydraulic valve arm is moved, a hydraulic valve is moved into a pressure applying position. Fluid pressure is routed to a hydraulic actuator on each pylon flap. The hydraulic actuators, cause the pylon flaps to assume their fully extended angular orientations. When the control column is removed from its maximum forward position, the hydraulic pressure is ported to the retract side of the hydraulic actuator to thereby drive the pylon flaps to their fully retracted positions. The present invention thus provides moveable aerodynamic surfaces that aid in the recovery from a deep stall condition by generating aircraft-nose-down pitching moments that help to reduce the aircraft angle of attack.

These and other aspects of the present invention are apparent in the following detailed description and claims, particularly when considered in conjunction with the accompanying drawings in which like parts bear like reference numerals.

DETAILED DESCRIPTION OF THE PRESENTLY PREFERRED EMBODIMENTS

Figure 1:
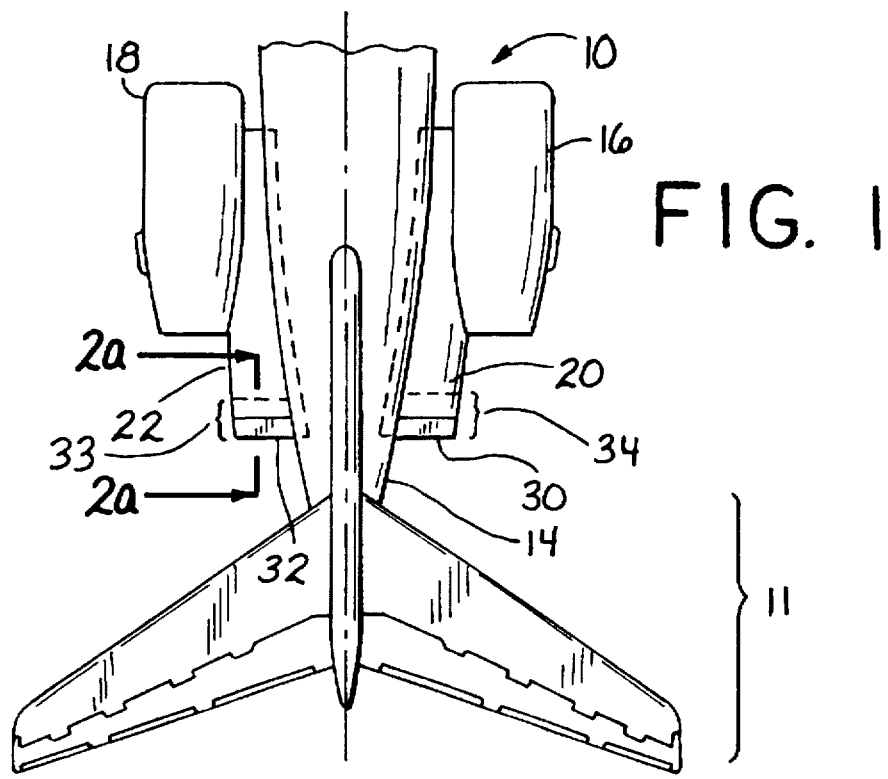
FIG. 1 is a top planar view of the rear portion of a T-tailed aircraft according to the presently preferred embodiment.

An aircraft fuselage 10 of a typical T-tailed aircraft is illustrated in FIG. 1. A T-tail 11 is attached to the aft portion 14 of the aircraft fuselage 10. A first jet engine 16 is connected to the right side of the aft portion 14, and a second jet engine 18 is attached to the left aft portion 14 of the aircraft fuselage 10. First and second jet engine pylons 20, 22, are used to connect the first and second jet engines 16, 18, to the aft fuselage, to provide and aerodynamic surface to thereby reduce drag.

Another aerodynamic surface included in the presently preferred embodiment comprises an extended left pylon trailing edge 33 and an extended right pylon trailing edge 34. These pylon trailing edges are extended from the original design to aid in deep stall recovery. The first pylon flap 30 and the second pylon flap 32 are positioned in aft portions of the first jet engine pylon 20 and the second jet engine pylon 22, respectively.

Figure 2A:
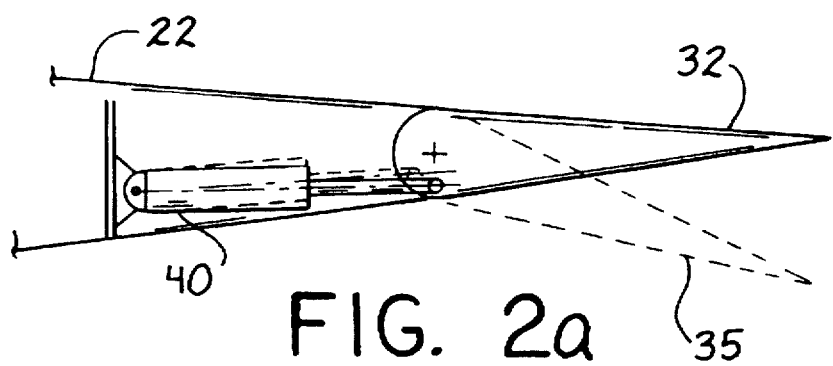
FIG. 2a is a cross-sectional view of the pylon flap of the presently preferred embodiment.

The pylon-flap assembly of the present invention was conceived as a device to assist the elevator in deep-stall recovery, but it also supplements the airplane-nose-down elevator power when the pylon-flaps are deflected. FIG. 2a is a cross-sectional view, taken along the line 2a—2a of FIG. 1, of the left pylon trailing edge 33. The pylon flap 32 is simply a trailing edge flap on the engine pylon 22. Although the pylon flap 32 preferably comprises a simple hinged flap, other types of flaps, such as a split flap, can alternatively be used. When deflected trailing-edge-down as illustrated in phantom at 35 in FIG. 2a, the pylon flap 32 produces an airplane-nose-down pitching moment.

Figure 2B:
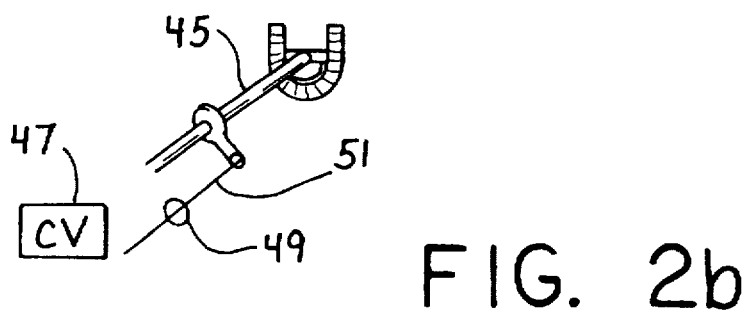
FIG. 2b is a schematic view of the user input assembly according to the present invention.

As presently embodied, the pylon flap 32 has two positions, retracted and fully deflected. It deflects only when the pilot commands full down elevator by pushing a control column 45, as shown in FIG. 2b, to the full-forward column position. The pylon flap 32 can, if desired, be implemented to deflect proportionally to forward column travel, similar to an elevator. This is the preferred embodiment, but other means of implementation may be used.

As shown in FIG. 2a, the position of the pylon flap 32 is preferably controlled by a hydraulic actuator 40. The hydraulic actuator 40 is used to drive and hold the flap 32 to both the fully retracted position and the fully deflected position.

Control of hydraulic pressure to the actuator 40 is preferably provided by a two-position control valve 47 (FIG. 2b). This valve 47 determines which side of the actuator piston receives hydraulic pressure. As presently embodied, a spring (not shown) pushes the control valve 47 to a first position that causes the actuator 40 to hold the pylon flap 32 in the retracted position. When the control column 45 is pushed to the forward stop (not shown), a small collar 49 attached to the elevator control cable 51 pushes the control valve 47 to a second position that causes the actuator 40 to drive the pylon flap 32 to its deflected position. When the control column 45 moves off of the forward stop, the collar 49 on the elevator cable 51 moves away from the control valve 47 allowing the control valve spring to drive the control valve 47 back to the first position which causes the actuator 40 to drive the pylon flap 32 back to the retracted position.

Although mechanical means are preferred for moving the control valve 47, this can be done using other means. According to an alternate approach, a full-forward control column 45 generates an electrical command to a solenoid which moves the valve to thereby obtain actuator 40 motion for deflecting the pylon flap 32. This type of system is especially applicable to an aircraft with a fly-by-wire type of control system.

Any large angle of attack orientation of the T-tailed aircraft tends to decrease directional stability. Deflection of the first and second pylon flaps 30, 32 of the present invention provides an increase in directional stability for the aircraft. When the first and second pylon flaps 30, 32 are deflected, an increased amount of air flow is passed over the vertical portion of the T-tail 11, thus advantageously increasing the directional stability of the T-tailed aircraft.

The actuating system of the presently preferred embodiment of the pylon flaps 30, 32 is particularly advantageous because it has no effect on control column forces except when the control column is moved to the full forward position. This embodiment results in an extremely simple system with high reliability and minimum impact on the existing elevator system of a conventional T-tailed aircraft, and has the additional benefit of providing an increase in directional stability of the aircraft whenever the pylon flaps are deployed.

While this invention has been described with respect to various specific examples and embodiments, it is to be understood that the invention is not limited thereto and that it can be variously practiced within the scope of the following claims.

What is claimed is:

1. A flight control system for use in aircraft with fuselage mounted engines, comprising:

an aircraft fuselage having both a left aircraft fuselage side and a right aircraft fuselage side;

a jet engine disposed on one side of the left and right sides of said aircraft fuselage;

a jet engine pylon having a forward pylon portion and an aft pylon portion, said pylon being joined on one side thereof to said jet engine and a second side to said one side of the aircraft fuselage, to thereby join the jet engine to the fuselage;

a pylon flap disposed at the aft pylon portion of the jet engine pylon, the pylon flap being movable between a retracted pylon flap angular orientation and an extended pylon flap angular orientation;

user-input receiving means for receiving a full nose-down user input, the full nose-down user input being input by the user to command a pitch angle of the T-tailed aircraft to be decreased as quickly as possible; and pylon-flap controlling means for controlling the pylon flap to move from the retracted pylon-flap angular orientation to the extended pylon-flap angular orientation, upon reception of the full nose-down user input by the user-input receiving means.

2. The flight control system for use in a T-tailed aircraft according to claim 1, wherein the user-input receiving means may also receive a zero nose-down user input, and wherein the pylon-flap controlling means controls the pylon flap to move from the extended pylon-flap angular orientation to the retracted pylon-flap angular orientation, upon reception of the zero nose-down user input by the user-input receiving means.

3. The flight control system for use in a T-tailed aircraft according to claim 1 and further comprising:

a second jet engine disposed on the other of the left and right sides of the aircraft fuselage;

a second jet engine pylon having a forward pylon portion and an aft pylon portion, said second pylon being joined on one side thereof to said second jet engine and on a second side thereof to said other side of the aircraft fuselage, to thereby join the jet engine to the fuselage;

a second pylon flap disposed at the aft second pylon portion of the second jet engine pylon, the second pylon flap being movable between a retracted second pylon flap angular orientation and an extended second pylon flap angular orientation; and second pylon flap controlling means for controlling the second pylon flap to move from the retracted second pylon flap angular orientation to the extended second pylon flap angular orientation, upon reception of the full nose-down user input by the user-input receiving means.

4. The flight control system for use in a T-tailed aircraft according to claim 3, wherein movements of the first pylon flap by the first-pylon-flap controlling means approximately correspond to movements of the second pylon flap by the second-pylon-flap controlling means.

5. The flight control system for use in a T-tailed aircraft according to claim 1, wherein the full nose-down user input commands the pylon flap to deploy to its maximum deflection, and wherein less than full nose-down user input commands the pylon flap to retract.

6. An apparatus for providing pitching moments to a T-tailed aircraft having an aircraft fuselage and a jet engine, and for simultaneously increasing a directional stability of the T-tailed aircraft, the apparatus comprising:

receiving means for receiving a user input, the user input directing pitching moments to be generated by at least one pylon flap and a zero nose-down pitching moment to be generated by the pylon flap, the pylon flap being disposed on a pylon between a surface of the aircraft fuselage and the jet engine of the T-tailed aircraft;

extending means for extending the pylon flap to an extended pylon flap angular orientation, upon receipt of a user input for a maximum nose-down pitching moment to be generated by the pylon flap; and retracting means for retracting the pylon flap to a retracted pylon flap angular orientation, upon receipt of a user input for a zero nose-down pitching moment to be generated by the pylon flap.

7. The apparatus for providing pitching moments and for increasing a directional stability of a T-tailed aircraft according to claim 6, wherein the at least one pylon flap comprises two pylon flaps on opposite sides of a rear portion of the T-tailed aircraft.

8. The apparatus for providing pitching moments and for increasing a directional stability of a T-tailed aircraft according to claim 6, wherein the user input directing a maximum nose-down pitching moment corresponds to a full-forward movement of a control column of the T-tailed aircraft.

9. The apparatus for providing pitching moments and for increasing a directional stability of a T-tailed aircraft according to claim 6, wherein the directional stability is increased by directing a larger flow of air over a vertical tail portion of the T-tailed aircraft.

10. An apparatus for providing moments to a T-tailed aircraft, and for increasing a directional stability of the T-tailed aircraft, the apparatus comprising:

a control column movable in a forward direction by a user to command a negative pitch angle change of the T-tailed aircraft, and movable in a reverse direction by a user to command zero pitch angle change of the T-tailed aircraft;

a cable connected to the control column, the cable moving in a first direction when the control column is moved in the forward direction, and movable in a second direction when the control column is moved in the reverse direction;

a collar connected to the cable, the collar moving in the first direction when the control column is moved in the forward direction, and movable in the second direction when the control column is moved in the reverse direction;

a hydraulic valve arm movable between a hydraulic-pressure-applying position and a hydraulic-pressure-relieving position, the hydraulic valve arm being moved from the hydraulic-pressure-relieving position to the hydraulic-pressure-applying position when the collar is moved in the first direction;

at least one pylon flap; and hydraulically-activated actuating means for moving the pylon flap to an extended pylon flap angular orientation when the hydraulic valve is moved from the hydraulic-pressure-relieving position to the hydraulic-pressure-applying position, and for moving the pylon flap to a retracted pylon flap angular orientation when the hydraulic valve is moved from the hydraulic-pressure-applying position to the hydraulic-pressure-relieving position.

11. The apparatus for providing moments and for increasing directional stability of the T-tailed aircraft according to claim 10, wherein the pylon flap is located on a pylon between an aft aircraft fuselage surface and a jet engine of the T-tailed aircraft.

12. The apparatus for providing moments and for increasing a directional stability of the T-tailed aircraft according to claim 10, wherein the hydraulic valve arm is biased to the hydraulic-pressure-relieving position.

13. A method of moving at least one pylon flap on a T-tailed aircraft between a retracted pylon flap angular orientation and an extended pylon flap angular orientation, the method comprising the following steps:

receiving a user input, the user input directing one of a maximum nose-down pitching moment to be generated by the pylon flap and a zero nose-down pitching moment to be generated by the pylon flap, the pylon flap being located on a pylon between an aft aircraft fuselage surface and a jet engine of the T-tailed aircraft;

retracting the pylon flap to a retracted pylon flap angular orientation, upon receipt of a user input for a zero nose-down pitching moment to be generated by the pylon flap; and extending the pylon flap to an extended pylon flap angular orientation, upon receipt of a user input for a maximum nose-down pitching moment to be generated by the pylon flap.

14. The method of moving at least one pylon flap on a T-tailed aircraft between a retracted pylon flap angular orientation and an extended pylon flap angular orientation according to claim 13, wherein the step of receiving a user input is proceeded by a step of detecting a stall condition.

15. The method of moving at least one pylon flap on a T-tailed aircraft between a retracted pylon flap angular orientation and an extended pylon flap angular orientation according to claim 13, wherein the step of detecting a stall condition comprises a substep of detecting one of a normal stall condition, a post stall condition, or a deep-stall condition.

16. The method of moving at least one pylon flap on a T-tailed aircraft between a retracted pylon flap angular orientation and an extended pylon flap angular orientation according to claim 13, wherein the step of receiving a user input includes a substep of detecting a full forward movement of a control column of the T-tailed aircraft.

17. The method of moving at least one pylon flap on a T-tailed aircraft between a retracted pylon flap angular orientation and an extended pylon flap angular orientation according to claim 13, wherein a fully extended downward orientation of the pylon flap causes the aircraft to assume a more nose-down attitude.

18. The method of moving at least one pylon flap on a T-tailed aircraft between a retracted pylon flap angular orientation and an extended pylon flap angular orientation according to claim 17, wherein the fully extended downward orientation of the pylon flap provides additional directional stability to the T-tailed aircraft.

19. The method of moving at least one pylon flap on a T-tailed aircraft between a retracted pylon flap angular orientation and an extended pylon flap angular orientation according to claim 18, wherein the fully extended downward orientation of the pylon flap causes an increased air flow over a vertical tail portion of the T-tailed aircraft to thereby provide the additional directional stability to the T-tailed aircraft.

* * * * *